US005825005A

United States Patent [19]

Behnke

[11] Patent Number: 5,825,005

[45] Date of Patent: Oct. 20, 1998

[54] METHOD OF ENCODING IDENTIFICATION CARDS AND VERIFYING SUCH ENCODED IDENTIFICATION CARDS, AND APPARATUS FOR CARRYING OUT SUCH A METHOD

[76] Inventor: Alfons Behnke, Georg Schudtstr. 3, Bad Homburg v.d.H., 61350, Germany

[21] Appl. No.: 569,224

[22] PCT Filed: Feb. 26, 1994

[86] PCT No.: PCT/EP94/00565

§ 371 Date: Jan. 4, 1996

§ 102(e) Date: Jan. 4, 1996

[87] PCT Pub. No.: WO95/02225

PCT Pub. Date: Jan. 19, 1995

[30] Foreign Application Priority Data

Jul. 6, 1993 [DE] Germany .......................... 43 22 445.5

[51] Int. Cl.$^{6}$ ................................ G06K 3/00; G06K 9/00

[52] U.S. Cl. .............................. 235/380; 902/3; 382/124; 382/127

[58] Field of Search .................................... 235/380, 382; 902/3; 382/115, 116, 124, 127

[56] References Cited

U.S. PATENT DOCUMENTS

| | | | |
|---|---|---|---|
| 4,338,025 | 7/1982 | Engel | 356/71 |
| 4,532,508 | 7/1985 | Ruell | 382/124 |
| 4,582,985 | 4/1986 | Lofberg | 235/382 |
| 4,636,622 | 1/1987 | Clark | 235/382 |
| 4,995,086 | 2/1991 | Lilley et al. | 382/4 |
| 5,053,608 | 10/1991 | Sennayake | 235/380 |
| 5,461,217 | 10/1995 | Claus | 235/380 |
| 5,465,303 | 11/1995 | Levison et al. | 382/124 |
| 5,509,083 | 4/1996 | Abtahi et al. | 382/124 |
| 5,513,272 | 4/1996 | Bogosian, Jr. | 382/116 |

FOREIGN PATENT DOCUMENTS

| | | | |
|---|---|---|---|
| A 0 379 333 | 7/1990 | European Pat. Off. . | |
| A 0 504 616 | 9/1992 | European Pat. Off. . | |
| 30 44 881 | 7/1982 | Germany . | |
| A 33 35 678 | 4/1985 | Germany . | |
| 42 18 821 A1 | 10/1992 | Germany . | |
| 361177580 | 8/1986 | Japan | 382/124 |
| 362074176 | 4/1987 | Japan | 382/124 |
| 403036679 | 2/1991 | Japan | 382/127 |
| WO-A 86 06527 | 11/1986 | WIPO . | |
| WO-A 89 12287 | 12/1989 | WIPO . | |

*Primary Examiner*—Donald T. Hajec
*Assistant Examiner*—Douglas X. Rodriguez
*Attorney, Agent, or Firm*—Henry M. Feiereisen

[57] ABSTRACT

A method of codifying and comparing an identification card includes imprinting the identification card with a selected fingerprint of the owner which upon match with a corresponding natural fingerprint of the owner opens the access to a terminal that stores another fingerprint of the owner. If a comparison of this stored fingerprint matches also the corresponding natural fingerprint of the owner, the identification card is cleared for use.

12 Claims, 5 Drawing Sheets

METHOD OF ENCODING IDENTIFICATION CARDS AND VERIFYING SUCH ENCODED IDENTIFICATION CARDS, AND APPARATUS FOR CARRYING OUT SUCH A METHOD

BACKGROUND OF THE INVENTION

The invention relates to identifications cards of a type used in many forms and designs by banks, in trade and by the industry. Examples of such cards include: identity cards, check cards, credit cards, proofs of authority for locking units, vaults and the like, other security papers, savings bank deposit books, certificates.

In order to prevent unauthorized use of cards of this type, a wide range of safety measures has already been proposed, e.g. secret numbers and photographs. The former can be easily detected by observation. Photographs become outdated and are not forgery-proof.

Furthermore, it has been proposed to base the identification on one of the fingerprints of the card owner. According to DE 4,218,821 A1, a fingerprint of the card owner is imprinted on the credit card. Upon use, the natural fingerprint of the card owner is compared with the imprint on the card. However, fingerprints are also not forgery-proof and can be imitated and copied together with the credit card.

DE 3,335,678 A1 describes an identification card which stores a fingerprint of an individual in coded form. The codification of the stored fingerprint is effected on the basis of a characteristic code derived from this fingerprint according to a predetermined rule. A clearing signal is triggered only if a comparison shows that the natural fingerprint matches the fingerprint encoded on the identification card.

Codification and decoding as well as comparison of the codification is cumbersome.

SUMMARY OF THE INVENTION

It is an object of the invention is to provide an identification card which permits a codification and checking in a simple manner and which cannot be used by a third party when being stolen or lost.

According to the invention, a method of coding identification cards on the basis of fingerprints is proposed which includes taking of a plurality of fingerprints of the card owner by means of a fingerprint sensor. An imprint of the taken fingerprints is applied as a key code onto the identification card, and a scrambling code is used to select and store at least one of the other fingerprints as identification code.

According to the invention, prints are taken from all the fingers of both hands, including the thumbs, by means of a fingerprint sensor for generating the key code and the identification code. For many people who use the card only infrequently and, in particular, for the elderly, this has the advantage that it becomes unnecessary for them to remember the fingers from which the prints were taken for codification.

There is no need for the owner to know the fingerprint that is selected as key code. Especially for a layman, it will not be realizable, if only a particular part of the fingerprint is used for codification. Knowledge of the finger upon which the key code is based is of little value even to an unauthorized individual because it merely represents the key code which does not yet permit use of the identification card.

The plurality of prints offers greater security for scrambling. Scrambling codes and methods are known.

According to another embodiment of the invention, the key code is made only from prints of specific fingers. If this form of codification is combined with a measure that in a manner known per se renders the card useless if the key code fails to match the natural fingerprint, a further safety mechanism is integrated.

The identification code may be formed from a single fingerprint or from several fingerprints. Security is increased if there are several fingerprints. However, considering the differences between the fingerprints, a single print is in effect also completely sufficient.

According to another proposal of the invention, the method of identifying an identification card that is imprinted with a key code, comprises taking a plurality of fingerprints of the card owner by means of a fingerprint sensor, comparing the fingerprints with the fingerprint key code on the identification card and opening a memory if a natural fingerprint matches the fingerprint key code of the identification card, comparing the selected and stored fingerprint in accordance with a scrambling code with the taken natural fingerprints and generating a clearing signal in case one of the taken natural fingerprints matches the stored fingerprint.

This identification procedure is simple to execute and requires only use of relatively minor apparatus at the site of application of the identification card. When considering that the annual volume of credit card fraud in Germany alone amounts to DM 100 million, the advantage of the doubly secured fingerprint identification card according to the invention is substantial. Crooks can cause damages of up to DM 100,000 with one card.

The identification method according to the invention is executed by having the card owner dip his identification card into a fingerprint sensing and comparing device and placing some or all fingers of both hands onto the fingerprint sensor. According to further feature of the invention, the sensor surface is arched so that all the fingers, including the thumbs, rest closely thereon.

If a comparison of the fingerprint on the card matches one of the natural fingerprints, a signal clears access to a memory that contains the fingerprint of the card owner selected according to a scrambling system. This memory may be a local terminal on the site of application of the card. More advantageous is the use of a central terminal which is connected on-line to the fingerprint sensing and comparing device at the site of application.

On access to the memory, the stored fingerprint is compared with the transmitted fingerprints and if the stored fingerprint matches one of the transmitted fingerprints, the identification card is cleared.

Thus, an identification card is created which cannot be used without the card owner. The double codification rules out any misuse.

According to a further feature of the invention, an identification card may be provided with at least one more fingerprint key code, with a corresponding identification code fingerprint being associated thereto in the memory. The use of such cards is suitable when several individuals utilize the card for the same purpose at different times. The number of cards issued is kept low as a result. Such an identification card can also be used in place of a power of attorney which can easily be tampered with, e.g. for withdrawal of money.

An advantageous embodiment of the invention includes the storage of the fingerprint key code in a hologram on the identification card.

In accordance with the invention, the described inventive methods may also be used in addition to the applications referred to in paragraph 1 on page 1 for identifying the owner of paintings, porcelain, valuable prints and other objets of art. Instead of the identification card, the painting etc. is provided with a fingerprint key code that can only be removed by tearing it out. The key code print on the painting is compared in the same manner with a specific natural fingerprint of the owner. For the sake of double security, a specific natural fingerprint of the owner is then compared with a specific, scrambled fingerprint of the owner stored in a terminal.

Commercially available equipments may be used as fingerprint sensor. As stated above, the methods according to the invention can be carried out particularly well if the sensor surface is arched. As a result, all the fingers, including the thumbs, can rest thereon easily and completely.

A particularly advantageous, arched configuration is effected in accordance with the invention by a rotating drum, especially one having a diameter which is sufficiently great for contacting. Another advantageous embodiment is a band-shaped transparent film.

According to further feature of the invention, the sensor surface travels through a cleaning bath once the fingerprints have been taken. This is intended, in particular, for the immediate removal of the prints from the sensor surface so that they cannot be copied therefrom.

The security of the identification cards according to the invention is enhanced by arranging the fingerprint sensing and comparing device in a room with an entrance that can be locked by a signal as soon as the fingerprint key code and/or fingerprint identification code of the user fail to match the fingerprints of the authorized card owner. The additional arrangement of a camera and alarm device further supports this measure.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
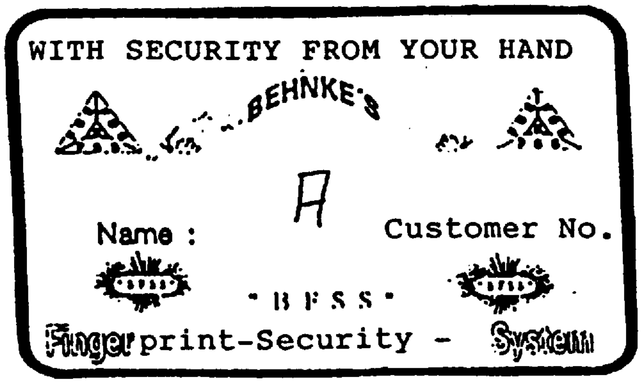
FIG. 1 shows an exemplified illustration of an identification card according to the present invention.

Turning now to FIG. 1, there is shown an exemplified illustration of an identification card according to the present invention, with site "A" designating an imprint of a key code commensurate with a fingerprint selected by a person or computer according to a scrambling code, from all or a plurality of fingerprints of both hands of that person.

Figure 2:
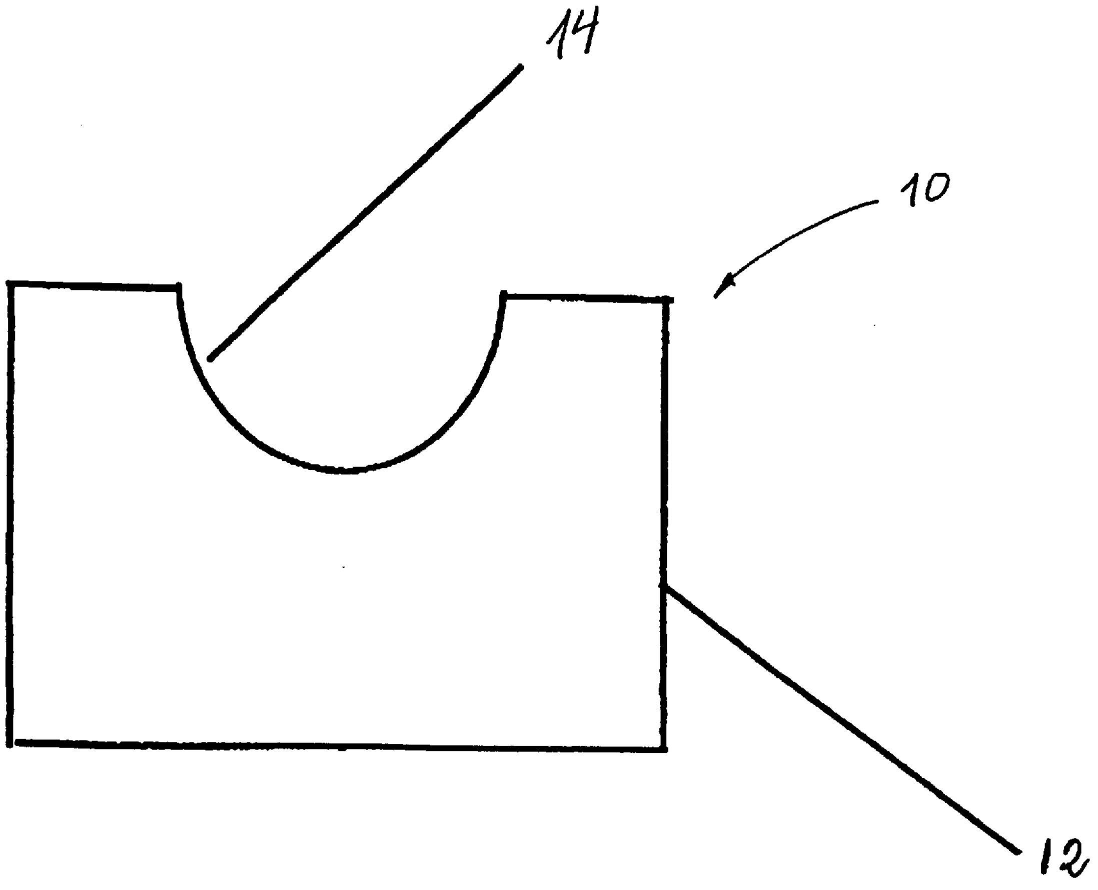
FIGS. 2 to 5 are schematic side views of various embodiments of a fingerprint sensor according to the present invention.
Figure 3:
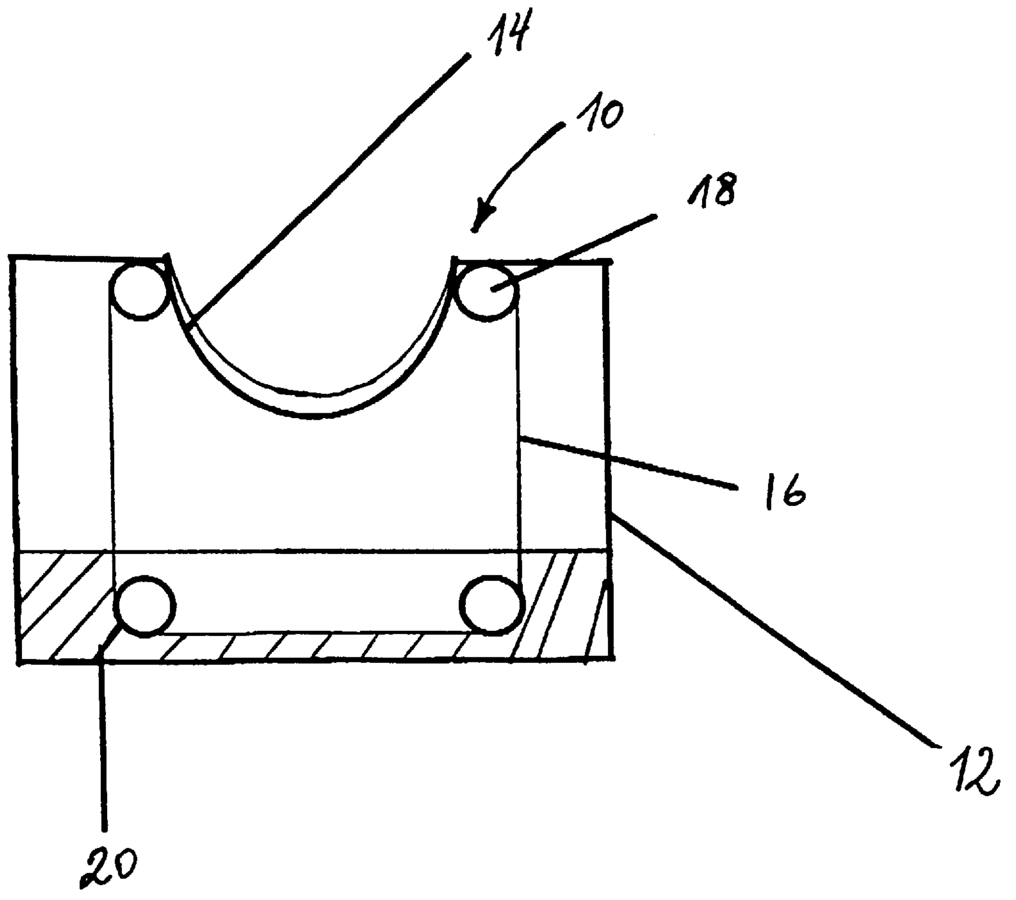

The fingerprints are taken by means of a fingerprint sensor, generally designated by reference numeral 10 and illustrated in more detail by way of example in FIGS. 2 to 5. FIG. 2 shows a schematic side view of a basic design of the fingerprint sensor 10, including a housing 12 provided on top with a recess 14 for formation of an arched sensor surface, thus allowing the fingertips, including thumb, of a hand to be completely scanned. FIG. 3 shows the fingerprint sensor 10 having incorporated in the housing 14 a band-shaped transparent film 16 which is guided by suitably positioned rollers 18 for advance across the recess 14 to serve as sensor surface. In order to effect an immediate removal of the imprint on the sensor surface 14 to prevent unauthorized copying after a fingerprint has been taken, the transparent film 16 travels subsequently through a cleaning bath 20 disposed in the travel path of the film 16 in the housing 12.

Figure 4:
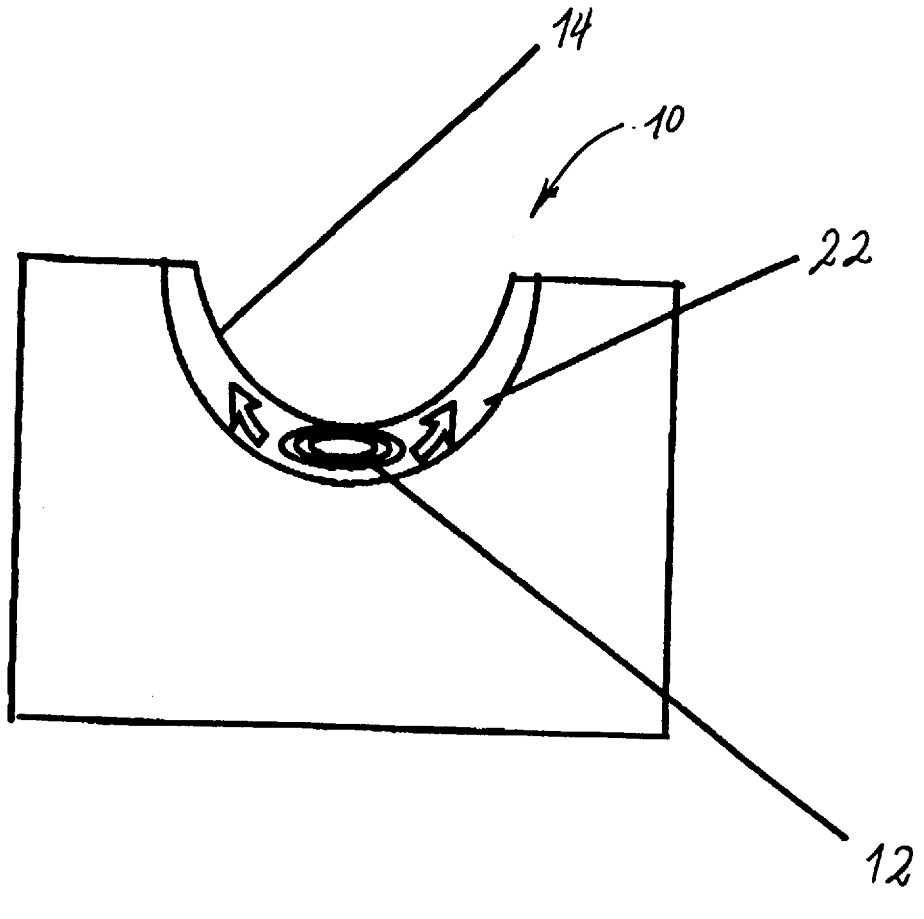
Figure 5:
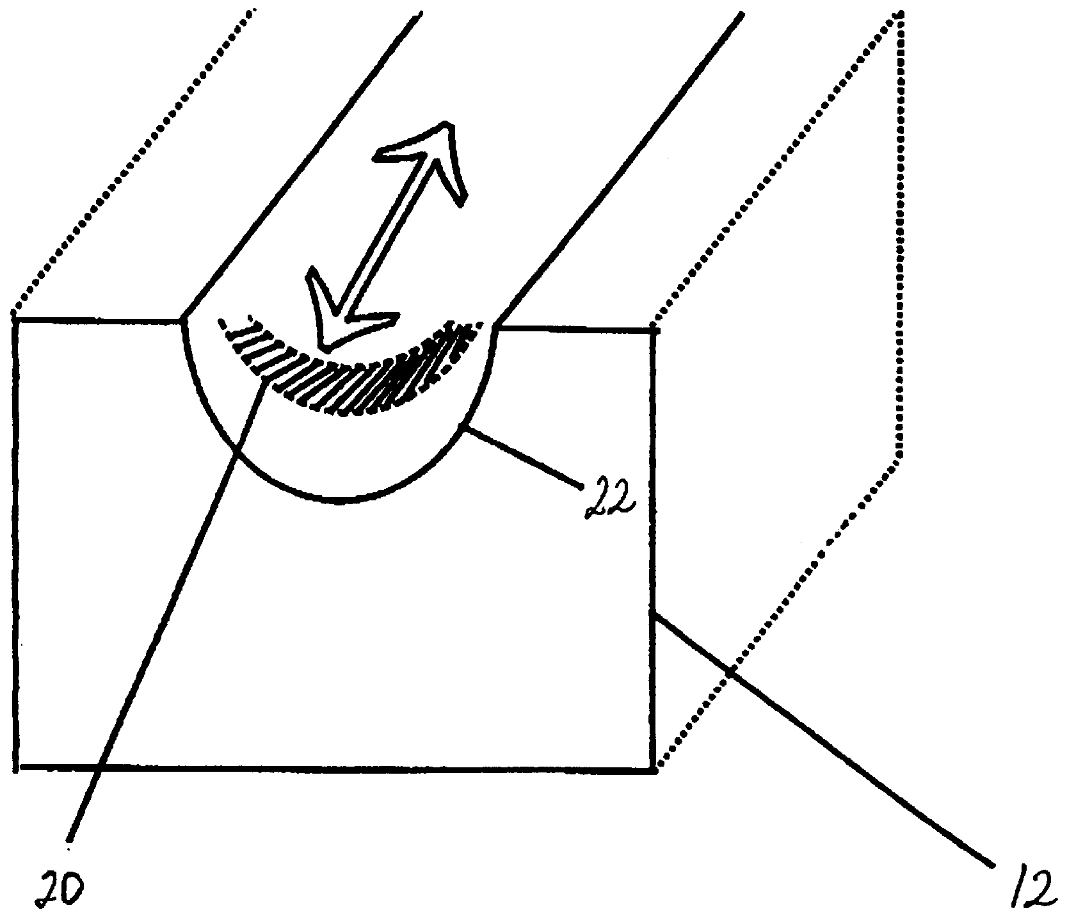

FIG. 4 shows a modification of the fingerprint sensor 10, with the arched sensor surface being formed by a rotating drum 22 that can move back and forth to allow scanning of the fingertips and thumb. FIG. 5 shows the fingerprint sensor 10 of FIG. 4 equipped with a cleaning unit indicated only schematically.

In order to write a key code on the identification card and to create the identification code, prints are taken from all the fingers of both hands, including the thumbs, by means of the fingerprint sensor 10 and stored in a central database. From the taken fingerprints, a person selects randomly a fingerprint for use as key code which is imprinted on the identification card. From the remaining fingerprints, the person then selects at least one other fingerprint which is used as identification code.

The identification procedure is as follows. Any person intending to use the identification card, dips the card into a suitable fingerprint sensing and comparing device. Upon confirmation of a match with the stored fingerprint, access to a memory is opened. Subsequently, the person deposits the finger or fingers commensurate with the identification code on the sensor surface 14 of the fingerprint sensor 10. If a match is confirmed, a clearing signal is triggered.

What is claimed is:

1. A method of verifying the authenticity of a person using an identification card, comprising the steps of:

- scanning and storing a plurality of fingerprints of a person by a fingerprint sensor;
- selecting at least one of the fingerprints for use as a key code for storage on the identification card and registration in a storage unit;
- selecting at least one of the remaining fingerprints for use as identification code and registration in the storage unit;
- upon insertion of the identification card in a terminal, comparing in a first verification phase the key code with the registered fingerprint in the storage unit for initiation of an identification process when a positive match is determined by the terminal; and
- reading a fingerprint of the person for comparison in a second verification phase with the registered identification code for authentication of the identification card when a positive match is determined between the fingerprint and the identification code.

2. The method of claim 1 wherein said scanning step includes scanning all fingers of both hands of the person.

3. The method of claim 1 wherein the key code is based on selection of a plurality of specific fingers of the person.

4. The method of claim 1 wherein the identification code is stored in the storage unit in the form of a central database which is connected on-line to a fingerprint sensing and comparing device.

5. The method of claim 1 wherein the key code is stored in a hologram.

6. A method of identifying the owner of an article such as painting, porcelain, valuable prints and other objects of art; comprising the steps of:

- scanning and storing a plurality of fingerprints of the owner by a fingerprint sensor;
- selecting at least one of the fingerprints for use as a key code for storage on the article and registration in a storage unit;

selecting at least one of the remaining fingerprints for use as identification code and registration in the storage unit;

comparing in a first verification phase the key code with the registered fingerprint in the storage unit for initiation of an identification process when a positive match is determined; and reading a fingerprint of a person for comparison in a second verification phase with the registered identification code for determination of existence of a positive match between the person's fingerprint and the identification code.

7. Apparatus for verifying the authenticity of a person using an identification card, comprising:

a fingerprint sensor for scanning and storing a plurality of fingerprints of a person;

a storage unit registering at least one of the fingerprints selected as a key code and printed on an identification card, and registering at least one of the remaining fingerprints for use as identification code; and a comparator for comparing in a first verification phase the key code with the registered fingerprint in the storage unit for initiation of an identification process when a positive match is determined by the terminal, and reading a fingerprint of the person for comparison in a second verification phase with the registered identification code for authentication of the identification card when a positive match is determined between the fingerprint and the identification code.

8. The apparatus of claim 7 wherein the sensor has a main body formed with an arched sensor surface.

9. The apparatus of claim 7 wherein the sensor surface is drum-shaped and rotatable.

10. The apparatus of claim 7 wherein the sensor surface is made of a band-shaped transparent film.

11. The apparatus of claim 7, and further comprising a cleaning bath, said sensor surface of the main body traveling through the cleaning bath after taking of the fingerprints.

12. The apparatus of claim 7, placed in a room with an entrance being lockable by a signal as soon as one of the first and second verification phases results in a mismatch of fingerprints.

* * * * *